United States Patent
Rastogi et al.

(10) Patent No.: US 12,095,614 B2
(45) Date of Patent: *Sep. 17, 2024

(54) PROCESSING UNMODIFIED CONFIGURATION DATA WITH A NETWORK DEVICE APPLICATION

(71) Applicant: Juniper Networks, Inc., Sunnyvale, CA (US)

(72) Inventors: Rajat Rastogi, Alwar (IN); Vikas G, Udupi (IN); Sandeep Hassan Ramanna, Santa Clara, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/179,429

(22) Filed: Mar. 7, 2023

(65) Prior Publication Data

US 2023/0208712 A1 Jun. 29, 2023

Related U.S. Application Data

(63) Continuation of application No. 17/405,294, filed on Aug. 18, 2021, now Pat. No. 11,627,040.

(51) Int. Cl.
*H04L 12/00* (2006.01)
*H04L 9/06* (2006.01)
(Continued)

(52) U.S. Cl.
CPC ........ *H04L 41/0816* (2013.01); *H04L 9/0643* (2013.01); *H04L 41/0853* (2013.01); *H04L 41/0886* (2013.01)

(58) Field of Classification Search
CPC ............. H04L 41/0816; H04L 9/0643; H04L 41/0853; H04L 41/0886; H04L 9/3239
(Continued)

(56) References Cited

U.S. PATENT DOCUMENTS 7,950,053 B2 5/2011 Muramoto et al.
10,157,295 B2 * 12/2018 Barinov ............... H04L 9/3236
(Continued)

FOREIGN PATENT DOCUMENTS

CN 101990238 A 3/2011
CN 113541994 A * 10/2021 ............. H04L 12/00
(Continued)

OTHER PUBLICATIONS

KR-102280505-B1, System and Method for Providing Authenticity and Integrity of Electronic Document, Jul. 2021, 27 Pages (Year: 2021).*

(Continued)

*Primary Examiner* — Frantz Coby
(74) *Attorney, Agent, or Firm* — Harrity & Harrity, LLP

(57) ABSTRACT

A network device may receive a first configuration object associated with an application and may parse the first configuration object to identify first configuration data. The network device may calculate a first hash value based on the first configuration data and may generate a first operational object based on the first configuration data and the first hash value. The network device may receive a second configuration object associated with the application of the network device and may parse the second configuration object to identify second configuration data. The network device may calculate a second hash value based on the second configuration data and may determine whether the first hash value matches the second hash value. The network device may prevent, based on the first hash value matching the second hash value, generation of a second operational object based on the second configuration data and the second hash value.

20 Claims, 10 Drawing Sheets

(51) Int. Cl.
*H04L 41/08* (2022.01)
*H04L 41/0816* (2022.01)
*H04L 41/0853* (2022.01)

(58) Field of Classification Search
USPC .......................................................... 709/220
See application file for complete search history.

(56) References Cited

U.S. PATENT DOCUMENTS

| | | | |
|---|---|---|---|
| 10,554,753 B2* | 2/2020 | Tormasov | ............ H04L 41/5019 |
| 11,627,040 B1* | 4/2023 | Rastogi | ................. H04L 9/0643 |
| | | | 709/220 |
| 2004/0187033 A1 | 9/2004 | Wang | |
| 2005/0022017 A1 | 1/2005 | Maufer et al. | |
| 2008/0282339 A1 | 11/2008 | Nakae et al. | |
| 2010/0040076 A1 | 2/2010 | Li et al. | |
| 2018/0115428 A1* | 4/2018 | Lysenko | ................ H04L 9/3247 |
| 2020/0358744 A1 | 11/2020 | Lee | |
| 2020/0379651 A1* | 12/2020 | Lazier | ..................... G06F 3/065 |
| 2022/0300452 A1* | 9/2022 | Diehl | .................... G06F 16/137 |

FOREIGN PATENT DOCUMENTS

| | | | | |
|---|---|---|---|---|
| EP | 1484886 | A2 | 12/2004 | |
| KR | 102280505 | B1 * | 7/2021 | ............. G06F 12/64 |
| WO | 2006041080 | A1 | 4/2006 | |

OTHER PUBLICATIONS

CN 113541994 A, Li Z et al. Network equipment configuration management method and system, Dec. 2020 (Year: 2020).*

Co-pending U.S. Appl. No. 17/405,294, inventors Rastogi; Rajat et al., filed Aug. 18, 2021.

* cited by examiner

PROCESSING UNMODIFIED CONFIGURATION DATA WITH A NETWORK DEVICE APPLICATION

RELATED APPLICATION

This application is a continuation of U.S. patent application Ser. No. 17/405,294, filed Aug. 18, 2021, which is incorporated herein by reference in its entirety.

BACKGROUND

A network device, such as a firewall, provides security for a network, classifies network traffic, monitors the network traffic, and/or the like based upon a set of conditions applied to traffic characteristics, such as content, entry points, exit points, and/or the like. If a packet satisfies one or more conditions of the set of conditions, the network device may perform one or more predefined actions on the packet.

SUMMARY

Some implementations described herein relate to a method. The method may include receiving a first configuration object associated with an application of the network device and parsing the first configuration object to identify first configuration data. The method may include calculating a first hash value based on the first configuration data and generating a first operational object based on the first configuration data and the first hash value. The method may include storing the first operational object in a library of the network device and receiving a second configuration object associated with the application of the network device. The method may include parsing the second configuration object to identify second configuration data and calculating a second hash value based on the second configuration data. The method may include determining whether the first hash value matches the second hash value and preventing, based on the first hash value matching the second hash value, generation of a second operational object based on the second configuration data and the second hash value.

Some implementations described herein relate to a network device. The network device may include one or more memories and one or more processors. The one or more processors may be configured to receive a first configuration object associated with an application of the network device and parse the first configuration object to identify first configuration data. The one or more processors may be configured to calculate a first hash value based on the first configuration data and generate a first operational object based on the first configuration data and the first hash value. The one or more processors may be configured to store the first operational object in a library of the network device and receive a second configuration object associated with the application of the network device. The one or more processors may be configured to parse the second configuration object to identify second configuration data and calculate a second hash value based on the second configuration data. The one or more processors may be configured to determine whether the first hash value matches the second hash value and prevent, based on the first hash value matching the second hash value, generation of a second operational object based on the second configuration data and the second hash value. The one or more processors may be configured to generate, based on the first hash value failing to match the second hash value, the second operational object based on the second configuration data and the second hash value.

Some implementations described herein relate to a non-transitory computer-readable medium that stores a set of instructions for a network device. The set of instructions, when executed by one or more processors of the network device, may cause the network device to store a first operational object in a library of the network device. The first operational object may be generated based on first configuration data provided in a first configuration object associated with an application of the network device and based on a first hash value calculated based on the first configuration data. The set of instructions, when executed by one or more processors of the network device, may cause the network device to receive a second configuration object associated with the application of the network device and parse the second configuration object to identify second configuration data. The set of instructions, when executed by one or more processors of the network device, may cause the network device to calculate a second hash value based on the second configuration data and determine whether the first hash value matches the second hash value. The set of instructions, when executed by one or more processors of the network device, may cause the network device to prevent, based on the first hash value matching the second hash value, generation of a second operational object based on the second configuration data and the second hash value.

DETAILED DESCRIPTION

Figure 1A:
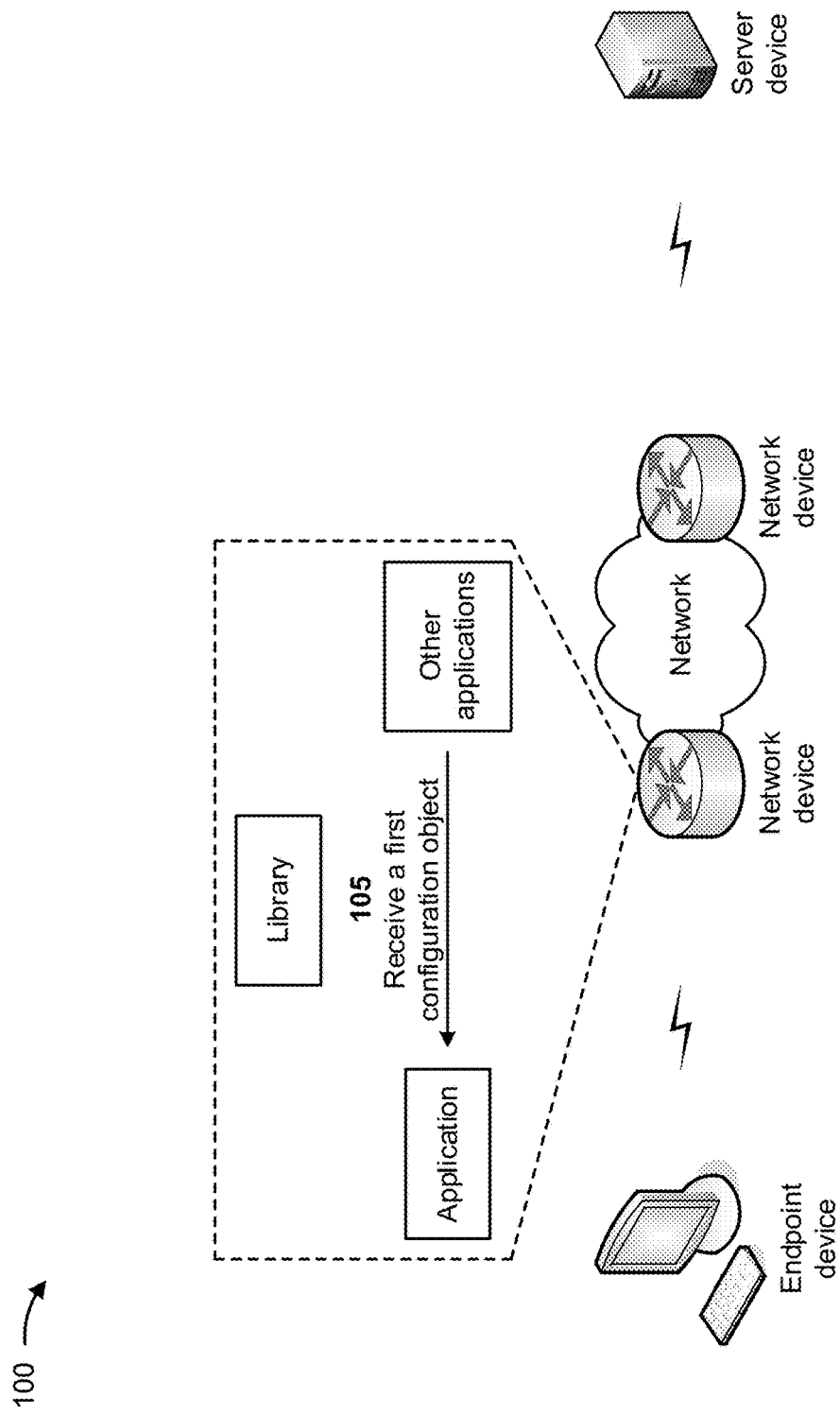
FIGS. 1A-1F are diagrams of an example associated with processing unmodified configuration data with a network device application.

The following detailed description of example implementations refers to the accompanying drawings. The same reference numbers in different drawings may identify the same or similar elements.

A filter of a network device includes a set of terms (e.g., rules) to be applied to network traffic. Each term includes a set of match conditions and actions. A match condition is a condition used to determine a match with a packet. If the packet satisfies the match condition or conditions in a term, then the network device applies respective actions to the packet. The network device processes the packet based on each of the terms and the packet is accepted or discarded. A network device may include one or more applications (e.g., firewall daemons) that are executed to provide a desired networking functionality. When an application is started or restarted, the application receives state data (e.g., objects) to which the application has subscribed. The state data may include objects generated by other applications, such as filter configuration objects, route objects, interface objects, and/or the like, and self-produced objects (e.g., operational objects) previously generated by the other applications. The state data may be received by the application as an event-based notification. Events may include a variety of types, such as an add event, a modify event, a delete event, and/or the like. After receiving the state data, the application may enter into an active state.

For example, if the application receives an add event for a configuration object (e.g., a filter configuration object), the application may parse the configuration object and create a filter based on the parsed configuration object. The application may provide the filter to a library of the network device, and the library may convert the filter into a compiled format. The library may optimize the filter in the compiled format and may convert the filter from the compiled format to a current filter. The library may identify a previously stored operational object and may convert the operational object to a previous filter. The library may determine whether the current filter matches the previous filter. If the current filter matches the previous filter, the library may not store the filter and/or the configuration object. The network device consumes valuable time and resources to determine that the configuration object is not to be stored in the library (e.g., since the operational object matches the configuration object). Thus, the application requires an inordinate amount of time to restart. This is further exacerbated when multiple configuration objects need to be processed by the library (e.g., many of which have not been modified). This results in the application taking a longer time to switch to the active state.

Thus, current techniques for updating applications, such as firewall daemons, consume computing resources (e.g., processing resources, memory resources, communication resources, and/or the like), networking resources, and/or the like, are associated with unnecessarily comparing configuration objects that have not changed, delaying an application restart, delaying traffic through a network due to the delayed application restart, handling lost traffic caused by the delayed application restart, and/or the like.

Some implementations described herein relate to a network device that processes unmodified configuration data with a network device application. For example, the network device may receive a first configuration object associated with an application of the network device and may parse the first configuration object to identify first configuration data. The network device may calculate a first hash value based on the first configuration data and may generate a first operational object based on the first configuration data and the first hash value. The network device may store the first operational object in a library of the network device and may receive a second configuration object associated with the application of the network device. The network device may parse the second configuration object to identify second configuration data and may calculate a second hash value based on the second configuration data. The network device may determine whether the first hash value matches the second hash value and may prevent, based on the first hash value matching the second hash value, generation of a second operational object based on the second configuration data and the second hash value.

In this way, the network device processes unmodified configuration data with a network device application. When the network device processes a new configuration object via the application, the network device may calculate a first hash based on information included in the configuration object. The network device may provide the first hash in a filter hash field of an operational object and may store the operational filter object (e.g., with the first hash) in a library of the network device when the application is restarted. After a time period, the network device may receive, via the application, an unmodified configuration object and may calculate a second hash based on information included in the unmodified configuration object. Since the configuration object is unmodified, the calculated second hash may match the first hash, and there is no need for the network device to further process the unmodified configuration object or compute a difference between the unmodified configuration object and the operational object. Thus, the network device conserves computing resources, networking resources, and/or that like that would otherwise have been consumed by unnecessarily comparing configuration objects that have not changed, delaying an application restart, delaying traffic through a network due to the delayed application restart, handling lost traffic caused by the delayed application restart, and/or the like.

FIGS. 1A-1F are diagrams of an example 100 associated with processing unmodified configuration data with a network device application. As shown in FIGS. 1A-1F, example 100 includes an endpoint device, a network of network devices (e.g., firewalls), and a server device. Further details of the endpoint device, the network, the network devices, and the server device are provided elsewhere herein.

As shown in FIG. 1A, each of the network devices may include an application, other applications, and a library. The application (e.g., a firewall daemon) may include an application that is executed to provide a desired networking functionality for the network device (e.g., firewall filtering). The other applications may be a filter configuration application, a routing application, an interface application, and/or the like. The library may include a data structure (e.g., a database, a table, a list, and/or the like) that stores information. For example, the library may store filters generated by the application and/or the other applications.

As further shown in FIG. 1A, and by reference number 105, the application of the network device may receive a first configuration object from one of the other applications. For example, when the application is started or restarted, the application may receive state data (e.g., objects) to which the application has subscribed. The state data may include objects generated by the other applications, such as the first configuration object. The first configuration object may include a filter configuration object, a route object, an interface object, a self-produced object (e.g., an operational object) previously generated by the same or other applications, and/or the like. The state data may be received by the application as an event-based notification. Events may include a variety of types, such as an add event, a modify event, a delete event, and/or the like.

Figure 1B:
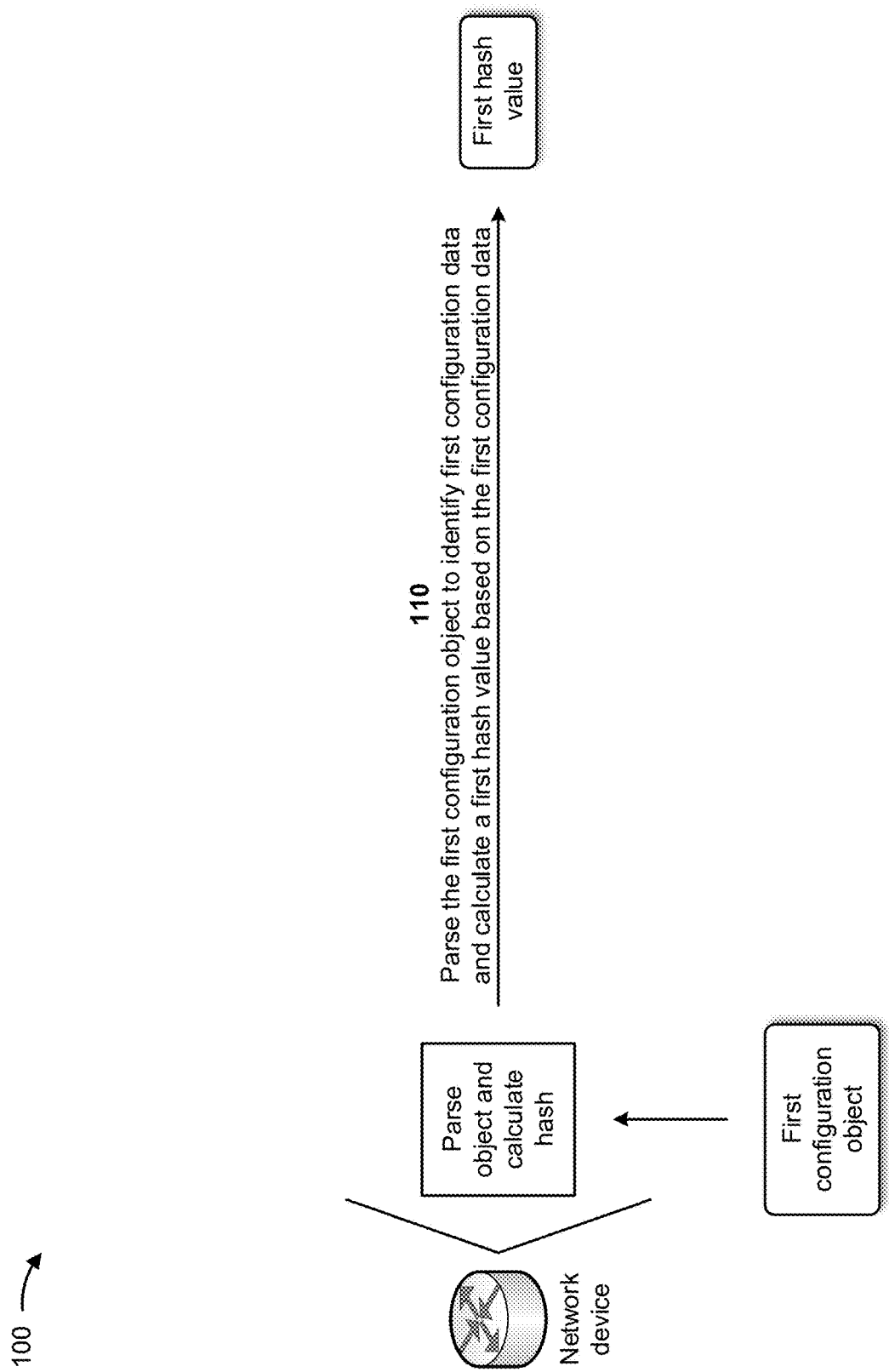

As shown in FIG. 1B, and by reference number 110, the network device may parse the first configuration object to identify first configuration data and may calculate a first hash value based on the first configuration data. For example, the network device may divide the first configuration object into one or more terms, one or more match conditions, one or more actions, and/or the like. The one or more terms, the one or more match conditions, the one or more actions, and/or the like may form the first configuration data.

When calculating the first hash value, the network device may determine a quantity of terms in the one or more terms of the first configuration data. For each of the quantity of terms, the network device may identify one or more match conditions associated with each of the quantity of terms. For each of the one or more match conditions, the network device may determine whether the match condition is newly added or modified. If the match condition is newly added or modified, the network device may update a first string value. If the match condition is not newly added or modified, the network device may refrain from updating the first string value. For each of the quantity of terms, the network device may identify one or more actions associated with each of the quantity of terms. For each of the one or more actions, the network device may determine whether the action is newly added or modified. If the action is newly added or modified, the network device may update the first string value. If the action is not newly added or modified, the network device may refrain from updating the first string value. The network device may calculate the first hash value based on the first string value, as updated based on the one or more match conditions and/or the one or more actions.

Figure 1C:
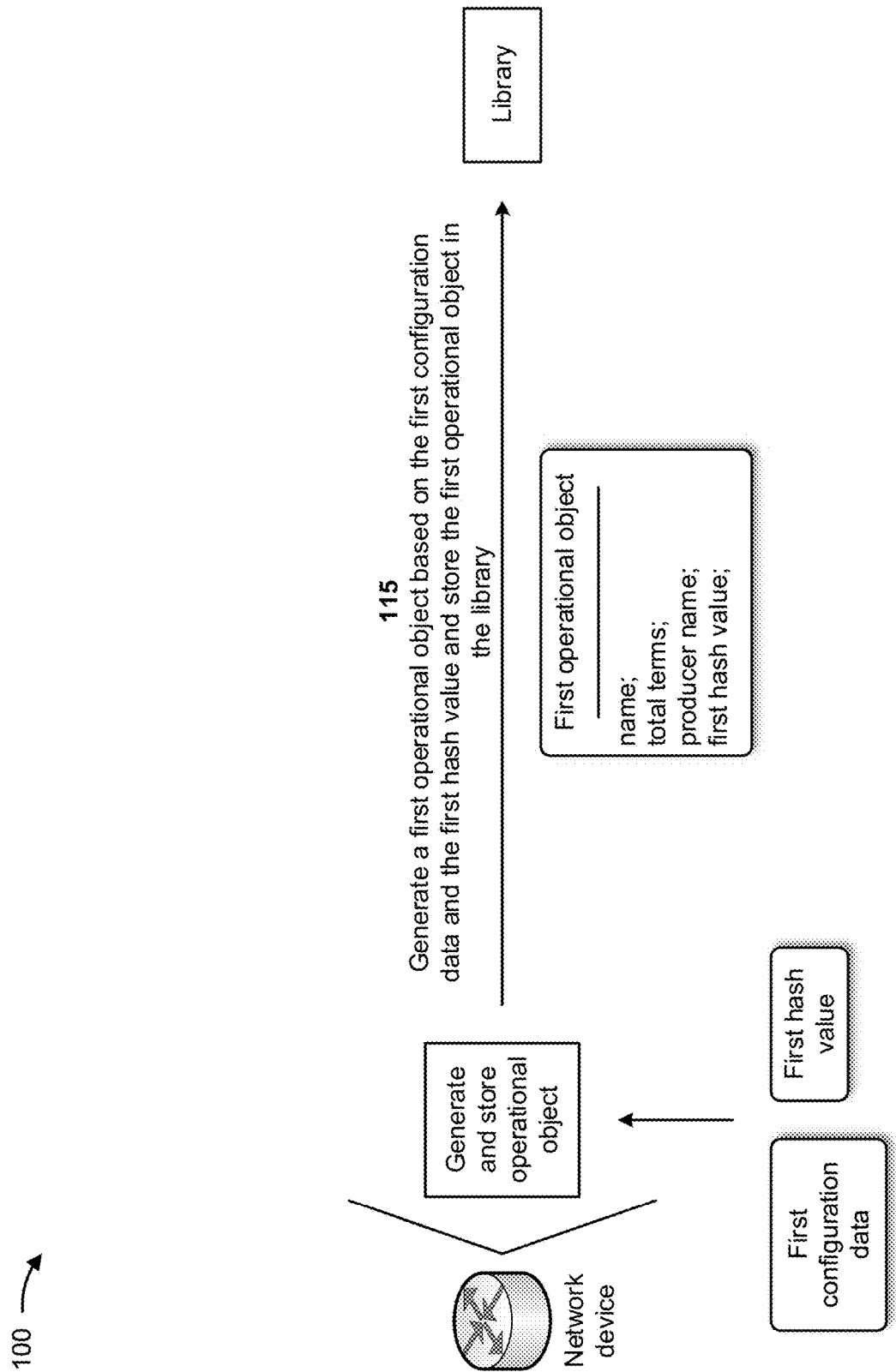

As shown in FIG. 1C, and by reference number 115, the network device may generate a first operational object based on the first configuration data and the first hash value and may store the first operational object in the library. In some implementations, the first operational object includes a field identifying a name of the first operational object, a field identifying the quantity of terms in the first operational object (e.g., the quantity of terms in the one or more terms of the first configuration data), a field identifying another application of the network device that produced the first configuration object (e.g., one of the other applications of the network device), a field identifying the first hash value, and/or the like. The network device may store the first operational object in the library so that the first operational object may be quickly compared to other operational objects in the future, as described elsewhere herein. In contrast to the configuration objects stored using current techniques, the first operational object may include the first hash value to enable the first operational object to be quickly compared to other operational objects in the future.

In some implementations, the network device may publish the first operational object prior to restarting the application and prior to storing the first operational object in the library. In some implementations, when storing the first operational object in the library, the network device may store the first operational object in the library based on restarting the application.

Figure 1D:
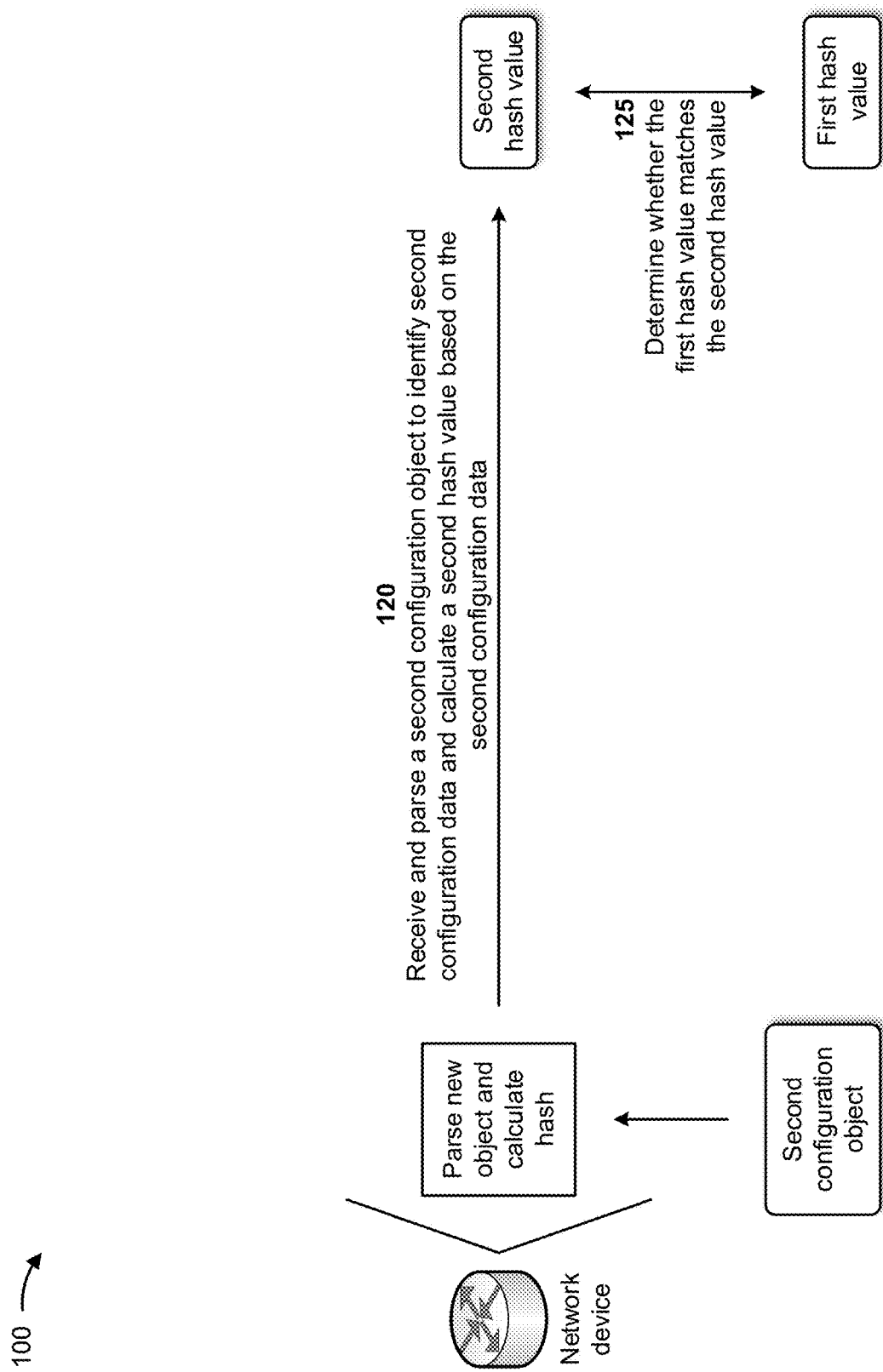

As shown in FIG. 1D, and by reference number 120, the application of the network device may receive a second configuration object from one of the other applications. For example, when the application is started or restarted, the application may receive state data (e.g., objects) to which the application has subscribed. The state data may include objects generated by the other applications, such as the second configuration object. The second configuration object may include a filter configuration object, a route object, an interface object, a self-produced object (e.g., an operational object) previously generated by the other applications, and/or the like. In additional, the application may receive a self-produced object (e.g., an operational object) or operational objects produced by other applications. The state data may be received by the application as an event-based notification. Events may include a variety of types, such as an add event, a modify event, a delete event, and/or the like.

As further shown in FIG. 1D, and by reference number 120, the network device may parse the second configuration object to identify second configuration data and may calculate a second hash value based on the second configuration data. For example, the network device may divide the second configuration object into one or more terms, one or more match conditions, one or more actions, and/or the like. The one or more terms, the one or more match conditions, the one or more actions, and/or the like may form the second configuration data.

When calculating the second hash value, the network device may determine a quantity of terms in the one or more terms of the second configuration data. For each term of the quantity of terms, the network device may identify one or more match conditions associated with each of the quantity of terms. For each match condition of the one or more match conditions, the network device may determine whether the match condition is newly added or modified. If the match condition is newly added or modified, the network device may update a second string value. If the match condition is not newly added or modified, the network device may refrain from updating the second string value. For each term of the quantity of terms, the network device may identify one or more actions associated with each of the quantity of terms. For each action of the one or more actions, the network device may determine whether the action is newly added or modified. If the action is newly added or modified, the network device may update the second string value. If the action is not newly added or modified, the network device may refrain from updating the second string value. The network device may calculate the second hash value based on the second string value, as updated based on the one or more match conditions and/or the one or more actions.

As further shown in FIG. 1D, and by reference number 125, the network device may determine whether the first hash value matches the second hash value. For example, the network device may compare the first hash value and the second hash value and may determine that the first hash value matches the second hash value (e.g., have equivalent values) based on comparing the first hash value and the second hash value. Alternatively, the network device may determine that the first hash value fails to match the second hash value (e.g., have different values) based on comparing the first hash value and the second hash value.

Figure 1E:
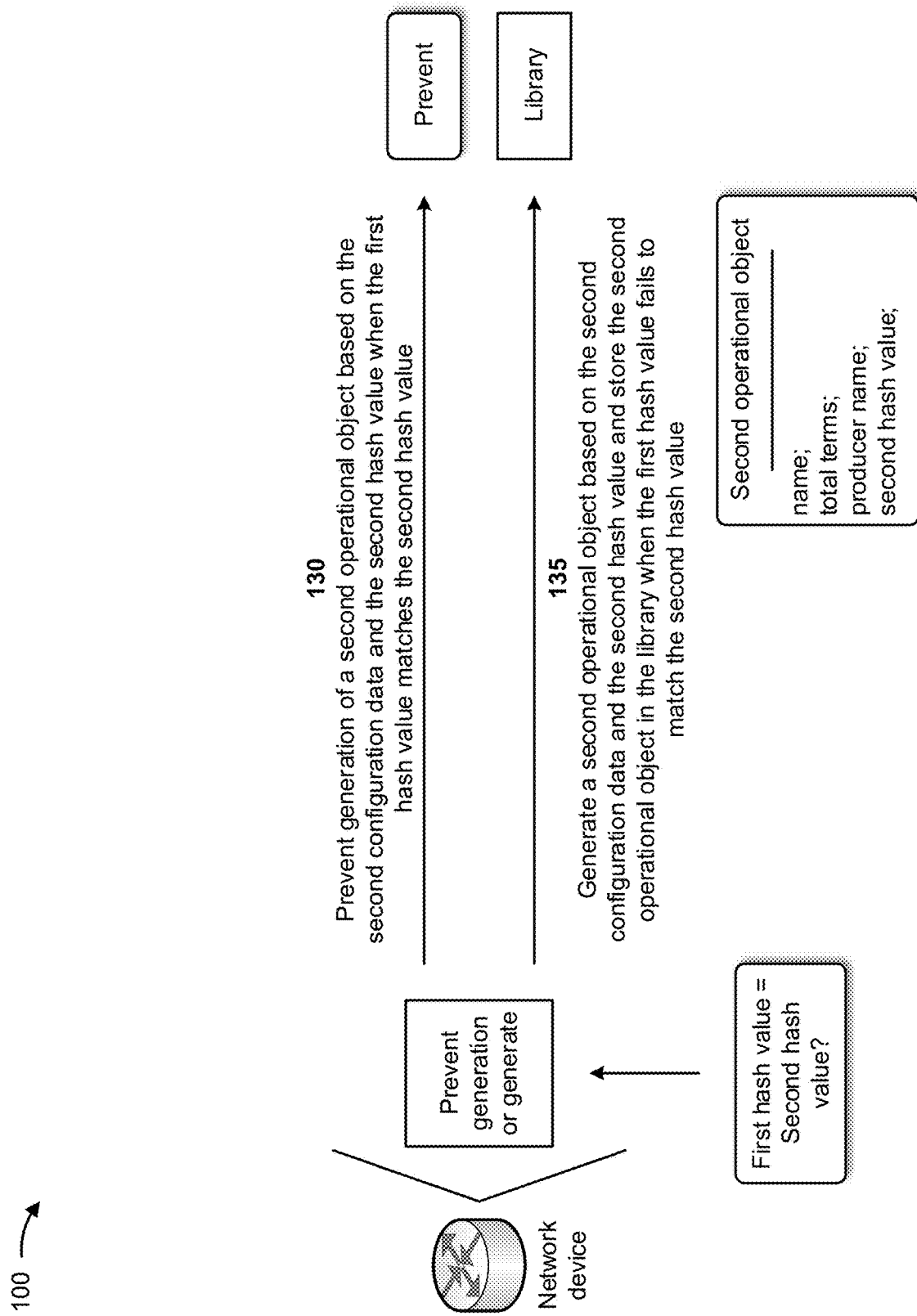

As shown in FIG. 1E, and by reference number 130, the network device may prevent generation of a second operational object based on the second configuration data and the second hash value when the first hash value matches the second hash value. For example, the network device may determine that the second configuration object is unmodified from and equivalent to the first configuration object when the first hash value matches the second hash value. Thus, the network device need not generate the second operational object based on the second configuration data and the second hash value because the second operational object would be unmodified from and equivalent to the first operational object. In this way, the network device conserves computing resources, networking resources, and/or the like that would otherwise have been consumed by unnecessarily comparing configuration objects that have not changed, delaying restart of the application, delaying traffic through the network due to the delayed application restart, handling lost traffic caused by the delayed application restart, and/or the like.

In some implementations, performance of the network device may be drastically improved with the implementations described herein (e.g., which prevents generation of the second operational object based on the second configuration data and the second hash value). For example, if the second configuration data includes eight thousand (8,000) terms, the network device may require one-hundred and eighty (180) seconds to process the second configuration data without the implementations described herein and may require sixteen (16) seconds to process the second configuration data with the implementations described herein. In such an example, the implementations described herein may provide a performance enhancement of 11.25 times over current techniques. In another example, if the second configuration data includes sixteen thousand (16,000) terms, the network device may require four-hundred (400) seconds to process the second configuration data without the implementations described herein and may require twenty-eight (28) seconds to process the second configuration data with the implementations described herein. In such an example, the implementations described herein may provide a performance enhancement of 14.29 times over current techniques.

As further shown in FIG. 1E, and by reference number 135, the network device may generate a second operational object based on the second configuration data and the second hash value and may store the second operational object in the library. In some implementations, the second operational object includes a field identifying a name of the second operational object, a field identifying the quantity of terms in the second operational object (e.g., the quantity of terms in the one or more terms of the second configuration data), a field identifying another application of the network device that produced the second configuration object (e.g., one of the other applications of the network device), a field identifying the second hash value, and/or the like. The network device may store the second operational object in the library so that the first operational object may be quickly compared to other operational objects in the future, as described above. In contrast to the configuration objects stored using current techniques, the second operational object may include the second hash value to enable the second operational object to be quickly compared to other operational objects in the future.

Figure 1F:
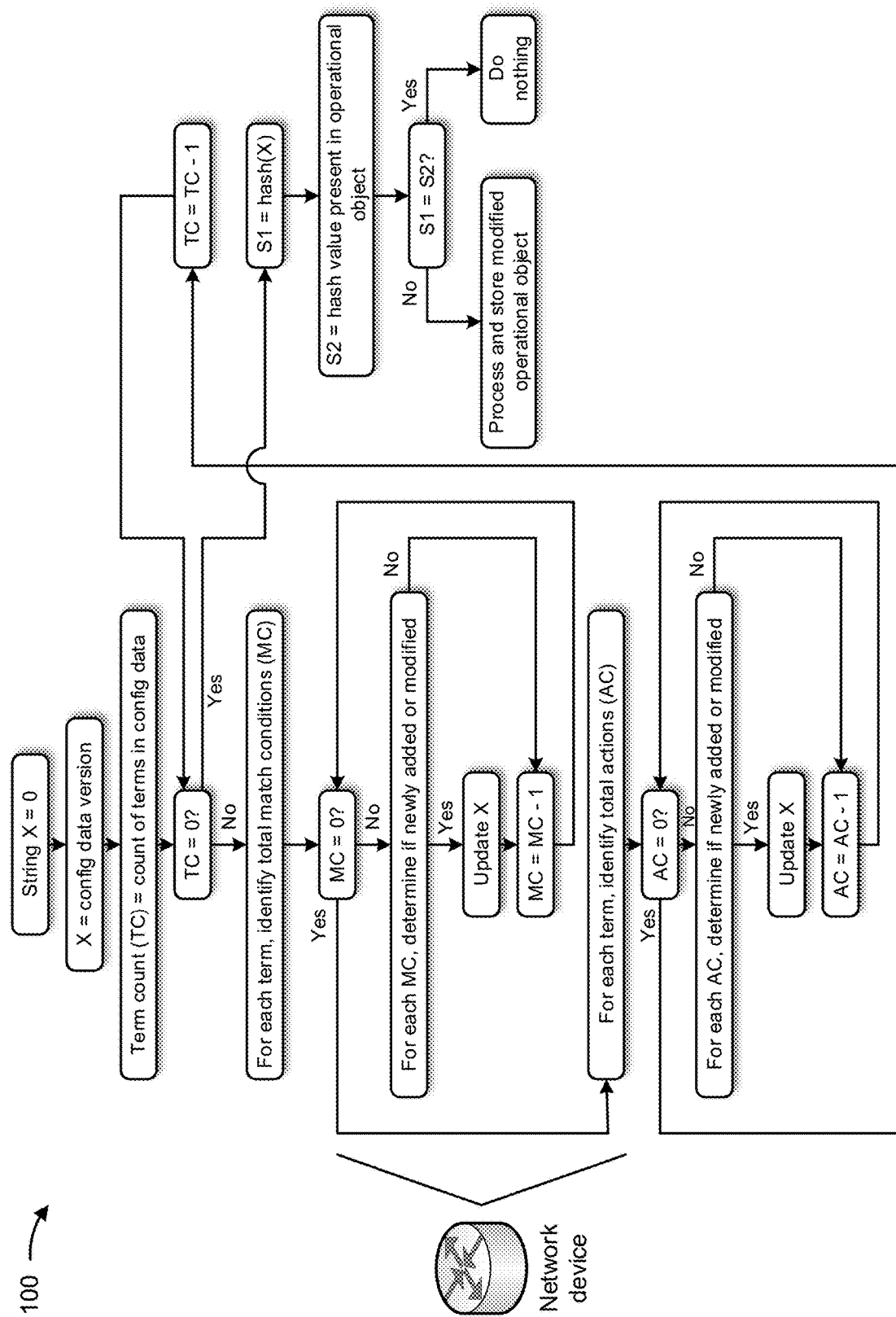

FIG. 1F depicts a process flow associated with the implementations described herein. As shown, the network device may set a string value (X) to zero and the string value may represent a configuration version of an application. The network device may determine a term count (TC) identifying a count of terms in configuration data received by the network device, and may determine whether the term count is equal to zero. If the term count is not equal to zero, the network device may identify total match conditions (MC) for each of the terms. The network device may determine whether the total match conditions is equal to zero for each term. If the total match conditions is not equal to zero, the network device may determine whether a match condition is newly added or modified. If the match condition is newly added or modified, the network device may update the string value. If the match condition is not newly added or modified, the network device may not update the string value. Finally, the network device may decrease the total match conditions by a value of one.

As further shown in FIG. 1F, if the term count is not equal to zero, the network device may identify total actions (AC) for each of the terms. The network device may determine whether the total actions is equal to zero. If the total actions is not equal to zero, the network device may determine whether an action is newly added or modified. If the action is newly added or modified, the network device may update the string value. If the action is not newly added or modified, the network device may not update the string value. Finally, the network device may decrease the total actions by a value of one. The network device may decrease the term count by a value of one and may process the match conditions and the actions until the term count is equivalent to zero.

As further shown in FIG. 1F, when the term count is equivalent to zero, the network device may calculate a first hash value (S1) based on the string value, as updated based on the match conditions and the actions being newly added or modified. The network device may compare the first hash value to a second hash value (S2) previously calculated for an operational object associated with the application. If the first hash value is equal to the second hash value, the network device may do nothing. If the first hash value is not equal to the second hash value, the network device may process and store a modified operational object associated with the application.

In this way, the network device processes unmodified configuration data with a network device application. When the network device processes a new configuration object via the application, the network device may calculate a first hash based on information included in the configuration object. The network device may provide the first hash in a filter hash field of an operational object and may store the operational filter object (e.g., with the first hash) in a library of the network device when the application is restarted. After a time period, the network device may receive, via the application, an unmodified configuration object and may calculate a second hash based on information included in the unmodified configuration object. Since the configuration object is unmodified, the calculated second hash may match the first hash and there is no need for the network device to further process the unmodified configuration object or compute a difference between the unmodified configuration object and the operational object. Thus, the network device conserves computing resources, networking resources, and/ or that like that would otherwise have been consumed by unnecessarily comparing configuration objects that have not changed, delaying an application restart, delaying traffic through a network due to the delayed application restart, handling lost traffic caused by the delayed application restart, and/or the like.

The implementations described herein may enable quick startup or restart of an application as compared to current techniques. During a restart of a scaled configuration, it is unlikely that the scaled configuration changed, and utilizing the implementations described herein may enable the network device to quickly detect no change. In contrast, current techniques perform full processing of unmodified filter configurations and then calculate a difference between an existing operational object and the newly processed operational object, which is very time consuming. In some implementations, a user of the network device may enable or disable the implementations described herein. For example, a user may disable the implementations described herein in network devices where applications frequently modified, and may enable the implementations described herein in network devices where it is unlikely that configurations change during restarts. In a distributed system, dependent objects may arrive out of order or may have been updated during a restart of an application. The implementations described herein may handle these issues by considering linkages to a dependent object and a version of the dependent object.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices)

shown in FIGS. 1A-1F may perform one or more functions described as being performed by another set of devices shown in FIGS. 1A-1F.

Figure 2:
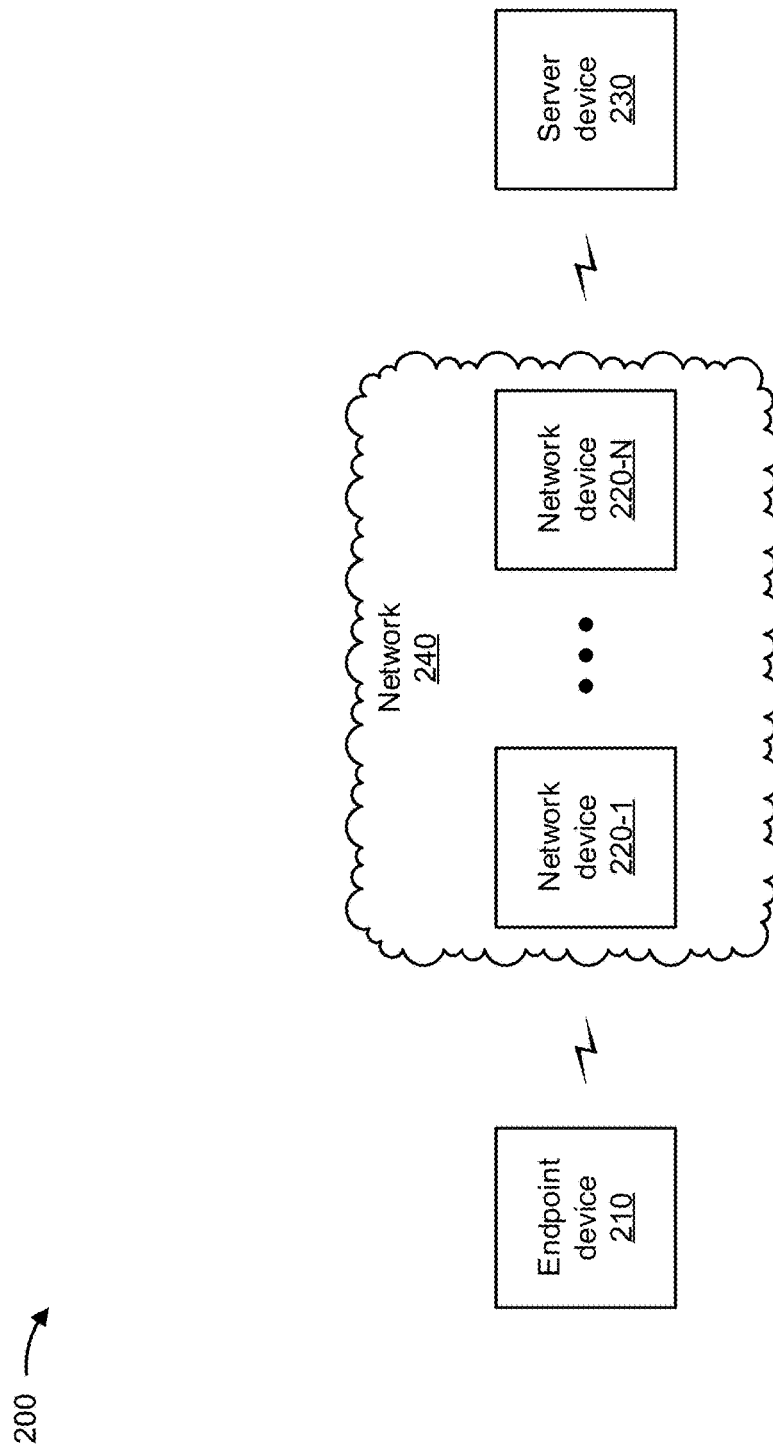
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (shown as network device 220-1 through network device 220-N), a server device 230, and a network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, the endpoint device 210 may receive network traffic from and/or may provide network traffic to other endpoint devices 210 and/or the server device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 includes one or more devices capable of receiving, generating, storing, processing, and/or providing information, such as information described herein. For example, the server device 230 may include a laptop computer, a tablet computer, a desktop computer, a group of server devices, or a similar type of device, associated with multicast traffic. In some implementations, the server device 230 may receive information from and/or transmit information (e.g., multicast traffic) to the endpoint device 210, via the network 240 (e.g., by routing packets using the network devices 220 as intermediaries).

The network 240 includes one or more wired and/or wireless networks. For example, the network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
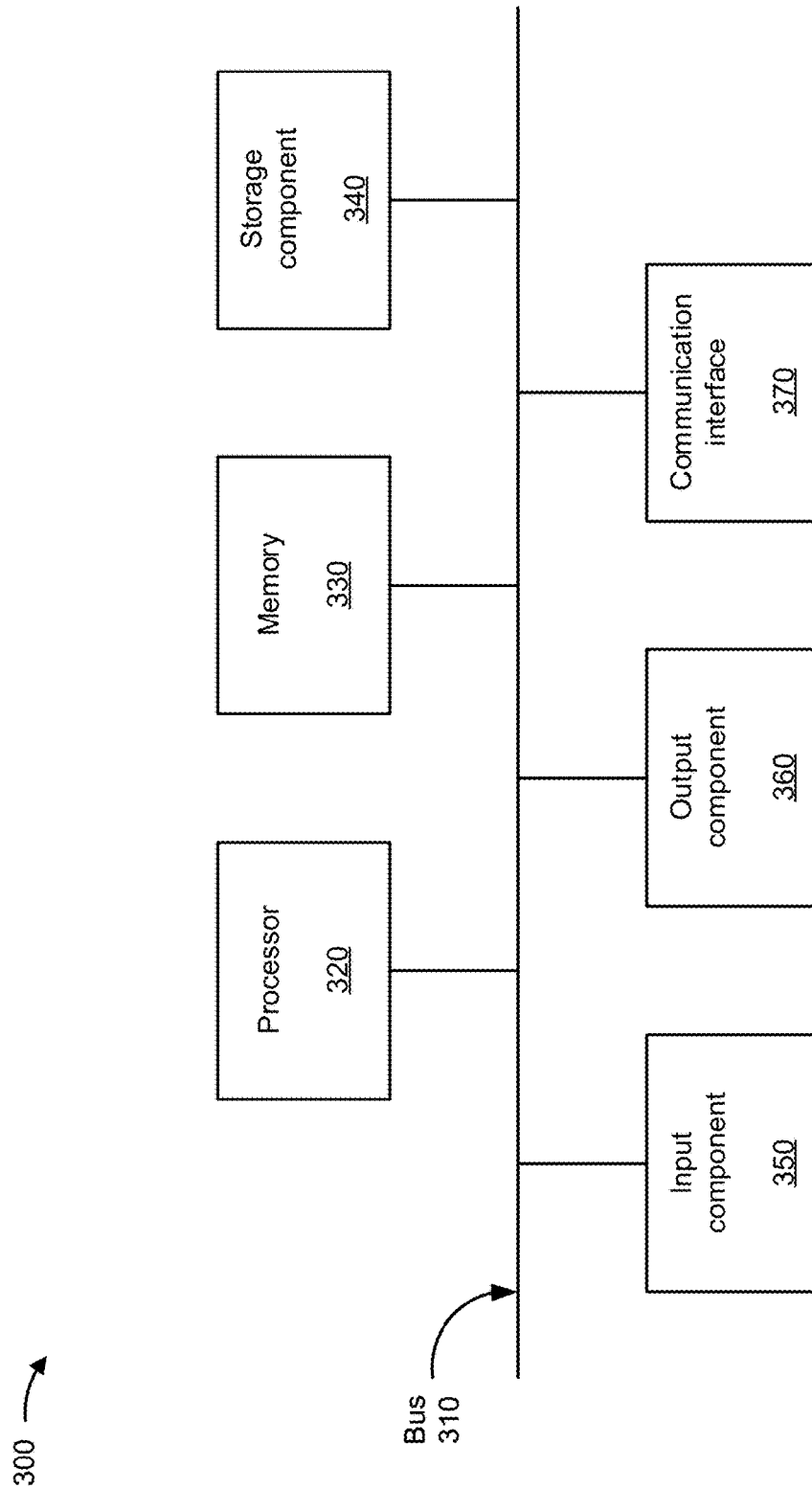
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, and/or the server device 230. In some implementations, the endpoint device 210, the network device 220, and/or the server device 230 may include one or more devices 300 and/or one or more components of the device 300. As shown in FIG. 3, the device 300 may include a bus 310, a processor 320, a memory 330, a storage component 340, an input component 350, an output component 360, and a communication component 370.

The bus 310 includes a component that enables wired and/or wireless communication among the components of the device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random-access memory, a read only memory, and/or another type of memory (e.g., a flash memory, a magnetic memory, and/or an optical memory).

The storage component 340 stores information and/or software related to the operation of the device 300. For example, the storage component 340 may include a hard disk drive, a magnetic disk drive, an optical disk drive, a solid-state disk drive, a compact disc, a digital versatile disc, and/or another type of non-transitory computer-readable medium. The input component 350 enables the device 300 to receive input, such as user input and/or sensed inputs. For example, the input component 350 may include a touch screen, a keyboard, a keypad, a mouse, a button, a microphone, a switch, a sensor, a global positioning system component, an accelerometer, a gyroscope, and/or an actuator. The output component 360 enables the device 300 to provide output, such as via a display, a speaker, and/or one or more light-emitting diodes. The communication component 370 enables the device 300 to communicate with other devices, such as via a wired connection and/or a wireless connection. For example, the communication component 370 may include a receiver, a transmitter, a transceiver, a modem, a network interface card, and/or an antenna.

The device 300 may perform one or more processes described herein. For example, a non-transitory computer-readable medium (e.g., the memory 330 and/or the storage component 340) may store a set of instructions (e.g., one or more instructions, code, software code, and/or program code) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
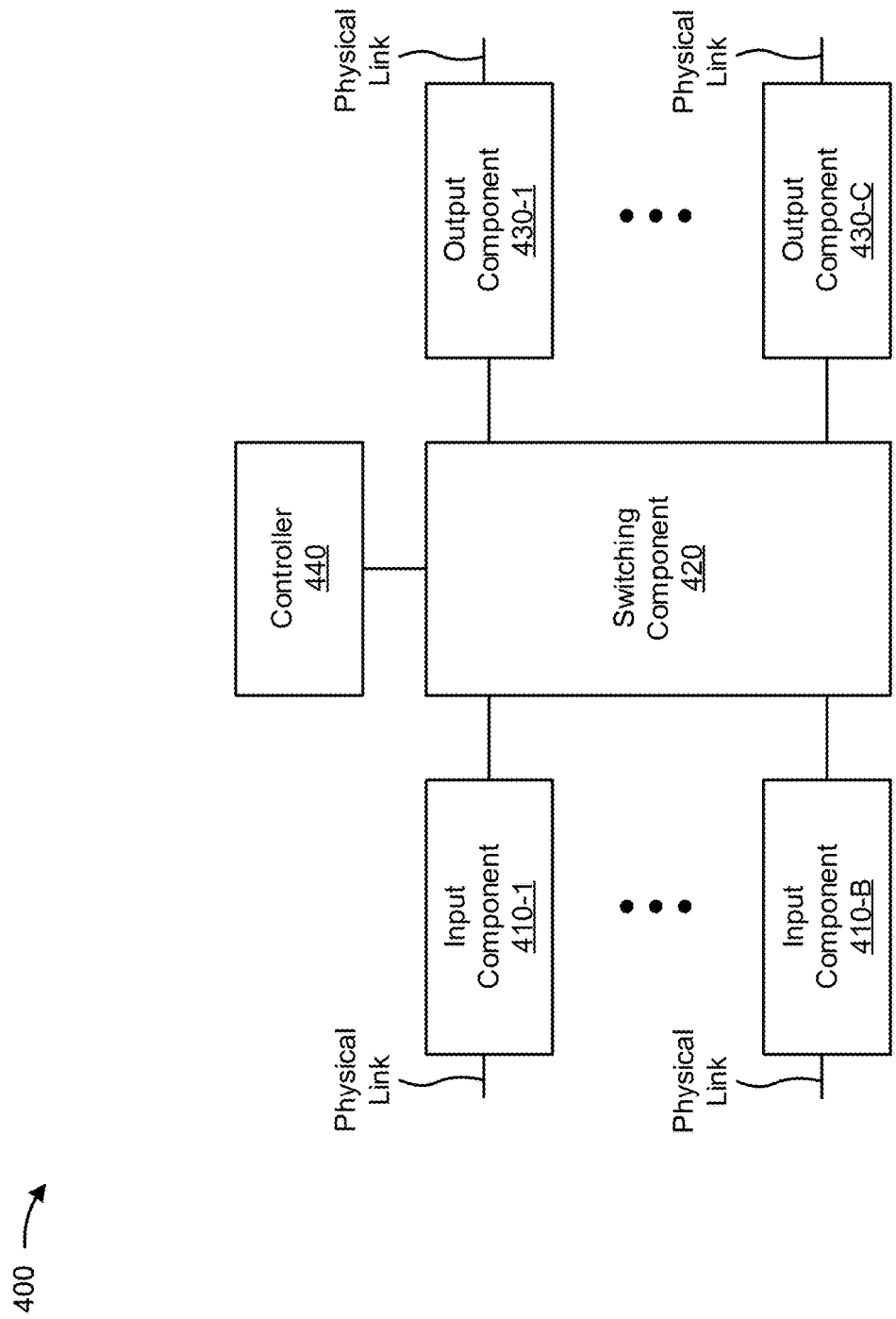

FIG. 4 is a diagram of example components of one or more devices of FIG. 2. The example components may be included in a device 400. The device 400 may correspond to the network device 230. In some implementations, the network device 230 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
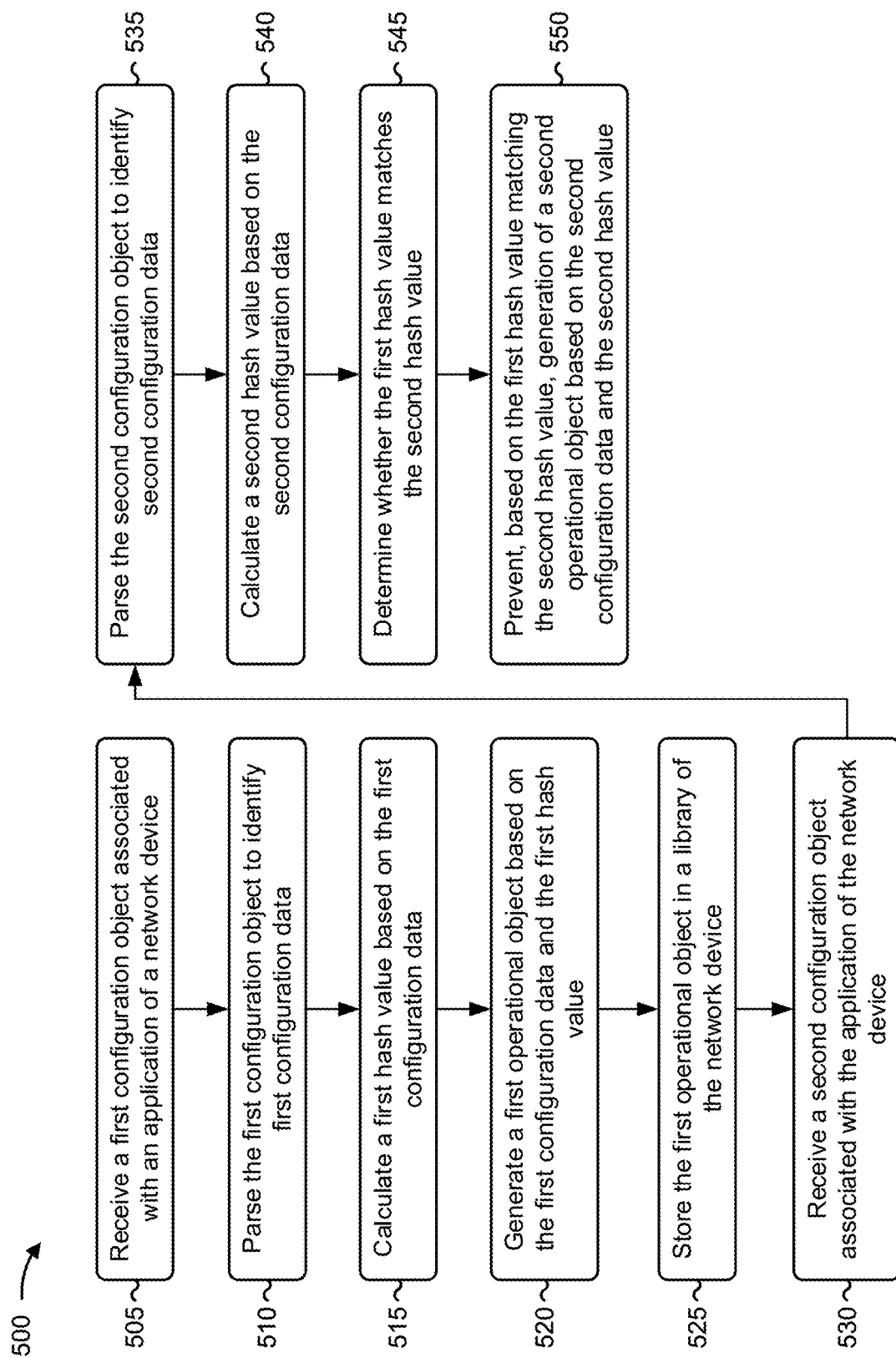
FIG. 5 is a flowchart of an example process for associated with processing unmodified configuration data with a network device application.

FIG. 5 is a flowchart of an example process 500 for processing unmodified configuration data with a network device application. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210) and/or a server device (e.g., the server device 230). Additionally, or alternatively, one or more process blocks of FIG. 5 may be performed by one or more components of the device 300, such as the processor 320, the memory 330, the storage component 340, the input component 350, the output component 360, and/or the communication component 370. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving a first configuration object associated with an application of the network device (block 505). For example, the network device may receive a first configuration object associated with an application of the network device, as described above. In some implementations, receiving the first configuration object includes receiving the first configuration object from one or more other applications of the network device. In some implementations, the network device is a firewall and the application is a firewall daemon.

As further shown in FIG. 5, process 500 may include parsing the first configuration object to identify first configuration data (block 510). For example, the network device may parse the first configuration object to identify first configuration data, as described above.

As further shown in FIG. 5, process 500 may include calculating a first hash value based on the first configuration data (block 515). For example, the network device may calculate a first hash value based on the first configuration data, as described above. In some implementations, calculating the first hash value based on the first configuration data includes determining whether match conditions in the first configuration data are newly added or modified, updating a string value based on the match conditions in the first configuration data being newly added or modified, determining whether actions in the first configuration data are newly added or modified, updating the string value based on the actions in the first configuration data being newly added or modified, and calculating the first hash value based on the string value and after updating the string value.

As further shown in FIG. 5, process 500 may include generating a first operational object based on the first configuration data and the first hash value (block 520). For example, the network device may generate a first operational object based on the first configuration data and the first hash value, as described above. In some implementations, the first operational object includes a field identifying a name of the first operational object, a field identifying a quantity of terms in the first operational object, a field identifying another application of the network device that produced the first configuration object, and a field identifying the first hash value.

As further shown in FIG. 5, process 500 may include storing the first operational object in a library of the network device (block 525). For example, the network device may store the first operational object in a library of the network device, as described above. In some implementations, storing the first operational object in the library includes storing the first operational object in the library based on restarting the application.

As further shown in FIG. 5, process 500 may include receiving a second configuration object associated with the application of the network device (block 530). For example, the network device may receive a second configuration object associated with the application of the network device, as described above. In some implementations, receiving the second configuration object associated with the application of the network device includes receiving the second configuration object based on restarting the application.

As further shown in FIG. 5, process 500 may include parsing the second configuration object to identify second configuration data (block 535). For example, the network device may parse the second configuration object to identify second configuration data, as described above.

As further shown in FIG. 5, process 500 may include calculating a second hash value based on the second configuration data (block 540). For example, the network device may calculate a second hash value based on the second configuration data, as described above. In some implementations, calculating the second hash value based on the second configuration data includes determining whether match conditions in the second configuration data are newly added or modified, updating a string value based on the match conditions in the second configuration data being newly added or modified, determining whether actions in the second configuration data are newly added or modified, updating the string value based on the actions in the second configuration data being newly added or modified, and calculating the second hash value based on the string value and after updating the string value.

As further shown in FIG. 5, process 500 may include determining whether the first hash value matches the second hash value (block 545). For example, the network device may determine whether the first hash value matches the second hash value, as described above.

As further shown in FIG. 5, process 500 may include preventing, based on the first hash value matching the second hash value, generation of a second operational object based on the second configuration data and the second hash value (block 550). For example, the network device may prevent, based on the first hash value matching the second hash value, generation of a second operational object based on the second configuration data and the second hash value, as described above.

Process 500 may include additional implementations, such as any single implementation or any combination of implementations described below and/or in connection with one or more other processes described elsewhere herein.

In some implementations, process 500 includes generating, based on the first hash value failing to match the second hash value, the second operational object based on the second configuration data and the second hash value, and storing the second operational object in the library. In some implementations, the second operational object includes a field identifying a name of the second operational object, a field identifying a quantity of terms in the second operational object, a field identifying another application of the network device that produced the second configuration object, and a field identifying the second hash value. In some implementations, process 500 includes activating the application after storing the second operational object in the library.

In some implementations, process 500 includes publishing the first operational object prior to restarting the application and prior to storing the first operational object in the library. In some implementations, process 500 includes activating the application based on the first hash value matching the second hash value.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    parsing, by a device, a first configuration object, associated with an application, to identify first configuration data,
        wherein parsing the first configuration object comprises processing an unmodified configuration object;
    calculating, by the device, a first hash value based on the first configuration data,
        wherein calculating the first hash value comprises calculating the first hash value based on unmodified configuration data included in the unmodified configuration object;
    determining, by the device, whether the first hash value matches a second hash value,
        wherein the second hash value is generated based on second configuration data; and
    preventing, by the device and based on the first hash value matching the second hash value, generation of a first operational object based on the first configuration data and the first hash value.

2. The method of claim 1, wherein the first configuration object is obtained based on the application starting or restarting.

3. The method of claim 1, wherein parsing the first configuration object comprises:
    dividing the first configuration object into one or more match conditions.

4. The method of claim 1, wherein calculating the first hash value comprises:
    determining a quantity of terms based on one or more terms of the first configuration data.

5. The method of claim 1, wherein the first operational object comprises one or more of:
    a field identifying a name of the first operational object,
    a field identifying a quantity of terms in the first operational object, or
    a field identifying another application of the device that produced the first configuration object.

6. The method of claim 1, further comprising:
    publishing the first operational object.

7. The method of claim 1, further comprising:
    storing the first operational object in a library of the device based on restarting the application.

8. A device, comprising:
    one or more memories; and
    one or more processors to:
        parse a first configuration object, associated with an application of the device, to identify first configuration data,
            wherein the one or more processors, to parse the first configuration object, are configured to process an unmodified configuration object;
        calculate a first hash value based on the first configuration data,
            wherein the one or more processors, to calculate the first hash value, are configured to calculate the first hash value based on unmodified configuration data included in the unmodified configuration object;
        determine whether the first hash value matches a second hash value,
            wherein the second hash value is generated based on second configuration data; and prevent, based on the first hash value matching the second hash value, generation of a first operational object based on the first configuration data and the first hash value.

9. The device of claim 8, wherein the one or more processors are further to:
obtain the second configuration data based on restarting the application.

10. The device of claim 8, wherein the second configuration data is obtained from another application.

11. The device of claim 8, wherein the second hash value is calculated based on dividing a second configuration object into one or more terms,
wherein the second configuration data includes the one or more terms.

12. The device of claim 8, wherein the one or more processors are further to:
determine a quantity of terms in one or more terms of the second configuration data,
identify one or more match conditions associated with each of the quantity of terms,
determine whether each match condition, of the one or more match conditions, is newly added or modified,
update a string value based on determining whether each match condition is newly added or modified, and
calculate the second hash value based on the string value.

13. The device of claim 8, wherein the one or more processors are further to:
determine that a second configuration object, associated with the second configuration data, is unmodified from the first configuration object.

14. The device of claim 8, wherein the one or more processors, to determine whether the first hash value matches the second hash value, are to:
determine that the first hash value and the second hash value have equivalent values based on comparing the first hash value and the second hash value.

15. A non-transitory computer-readable medium storing a set of instructions, the set of instructions comprising:
one or more instructions that, when executed by one or more processors of a device, cause the device to:
parse a first configuration object, associated with an application of the device, to identify first configuration data,
wherein the one or more instructions, that cause the device to parse the first configuration object, cause the device to process an unmodified configuration object;
calculate a first hash value based on the first configuration data,
wherein the one or more instructions, that cause the device to calculate the first hash value, cause the device to calculate the first hash value based on unmodified configuration data included in the unmodified configuration object;
determine whether the first hash value matches a second hash value,
wherein the second hash value is generated based on second configuration data; and
prevent, based on the first hash value matching the second hash value, generation of a first operational object based on the first configuration data and the first hash value.

16. The non-transitory computer-readable medium of claim 15, wherein the one or more instructions further cause the device to:
parse a second configuration object to identify the second configuration data.

17. The non-transitory computer-readable medium of claim 15, wherein the second configuration data is associated with state data.

18. The non-transitory computer-readable medium of claim 15, wherein the second hash value is calculated based on dividing a second configuration object based on one or more of:
one or more terms of the second configuration data,
one or more match conditions of the second configuration data, or
one or more actions of the second configuration data.

19. The non-transitory computer-readable medium of claim 15, wherein the one or more instructions further cause the device to:
activate the application based on the first hash value matching the second hash value.

20. The non-transitory computer-readable medium of claim 15, wherein the one or more instructions further cause the device to:
determine a quantity of terms in one or more terms of the second configuration data,
identify one or more actions associated with each of the quantity of terms,
determine whether each action, of the one or more actions, is newly added or modified,
update a string value based on determining whether each action is newly added or modified, and
calculate the second hash value based on the string value.

* * * * *